(12) United States Patent
Gross et al.

(10) Patent No.: US 6,642,894 B1
(45) Date of Patent: Nov. 4, 2003

(54) SMART ANTENNA FOR AIRBORNE CELLULAR SYSTEM

(75) Inventors: Jonathan H. Gross, Gilbert, AZ (US); Duke E. Hanson, Queen Creek, AZ (US); Thomas Peter Emmons, Jr., Mesa, AZ (US); James W. Startup, Tempe, AZ (US)

(73) Assignee: Motorola, Inc., Schaumburg, IL (US)

( * ) Notice: Subject to any disclaimer, the term of this patent is extended or adjusted under 35 U.S.C. 154(b) by 38 days.

(21) Appl. No.: 10/070,844

(22) PCT Filed: Jun. 26, 2000

(86) PCT No.: PCT/US00/17555
§ 371 (c)(1),
(2), (4) Date: Mar. 11, 2002

(87) PCT Pub. No.: WO01/20719
PCT Pub. Date: Mar. 22, 2001

Related U.S. Application Data

(60) Provisional application No. 60/153,620, filed on Sep. 13, 1999.

(51) Int. Cl.[7] .............................. H01Q 1/28; H04Q 7/20
(52) U.S. Cl. ...................................... 343/705; 455/431
(58) Field of Search ................................ 343/705, 706; 342/352, 354, 357, 359, 360, 361; 455/12.1, 431, 13.1, 11.1; H01Q 1/28; H04Q 7/20

(56) References Cited

U.S. PATENT DOCUMENTS

| 2,626,348 | A | * | 1/1953 | Nobles ...................... 455/11.1 |
| 5,187,805 | A | * | 2/1993 | Bertiger et al. ............. 455/430 |
| 5,548,292 | A | * | 8/1996 | Hirshfield et al. ........... 342/354 |
| 6,195,037 | B1 | * | 2/2001 | Gross et al. ................. 342/354 |
| 6,377,802 | B1 | * | 4/2002 | McKenna et al. .......... 455/430 |
| 6,556,809 | B1 | * | 4/2003 | Gross et al. ................ 455/12.1 |

FOREIGN PATENT DOCUMENTS

| EP | 0 421 704 A | * | 4/1991 | ........... H01B/1/185 |
| EP | 0 837 567 A | * | 4/1998 | ........... H04B/7/185 |
| WO | WO 97 07609 A | * | 2/1997 | |
| WO | WO 99 23769 A | * | 5/1999 | ........... H04B/7/185 |
| WO | WO 99 45609 A | * | 9/1999 | ........... H01Q/3/26 |

* cited by examiner

Primary Examiner—Don Wong
Assistant Examiner—Trinh Do Dinh
(74) Attorney, Agent, or Firm—Sharon K. Coleman Koath

(57) ABSTRACT

An airborne repeater antenna array (70) in which beams transmitted from multiple antenna elements (80) of the array to form terrestrial communications. cells are shaped according to predetermined system parameters. At least one of airplane telemetry data (58) indicating an airplane flight pattern location, adjacent cellular system beam footprint data, and call distribution load within a terrestrial cell are received, and a complex gain is dynamically computed for each of the multiple antenna elements based on such data to thereby output a plurality of beams that form desired geographic communications coverage cells (100, 102, 104, 108).

21 Claims, 4 Drawing Sheets

US 6,642,894 B1

SMART ANTENNA FOR AIRBORNE CELLULAR SYSTEM

CROSS-REFERENCE TO RELATED APPLICATION

The present application is related to, and claims priority from, provisional patent application serial No. 60-153620, entitled Wireless AERO Solutions for Communications Networks, filed on Sep. 13, 1999, the contents of which are incorporated herein by reference.

FIELD OF THE INVENTION

The present invention relates generally to a wireless communications system including an airborne repeater, and particularly to a smart antenna for use in such a system that is capable of beam steering and shaping and that compensates for motion of an airplane.

BACKGROUND OF THE INVENTION

The increasing need for communications networks and capabilities in outlying and geographically diverse locations has created greater demand for cellular systems. Many new carriers providing the infrastructure for such systems have focused their resources on building as many terrestrial cell stations as possible to expand their respective areas of coverage and consequently generate more revenue.

However, the buildout rate for the terrestrial cell stations is typically slow and expensive, especially in mountainous or otherwise difficult to access areas. In addition, in some of these areas, a carrier's return on investment may not provide the incentive necessary for the carrier to build the necessary cell stations, thereby leaving these areas with either limited or no cellular service at all. Further, many areas having a sufficient number of cellular communications base transceiving stations to handle calls during both off-peak and peak times cannot adequately handle large volumes of calls during sporting events or other short-term special events that temporarily attract large crowds.

In response to the above, airborne cellular systems have been proposed in which a cellular repeater mounted in an airplane, flying a predetermined flight pattern over a geographic area, links calls from cellular phones within the covered geographic area to a terrestrial base station. Because the airplane is capable of traversing geographic limitations and takes the place of the cell stations, such a system overcomes the above-mentioned limitations of conventional terrestrial cellular systems.

Despite its many advantages, an airborne cellular system presents design and implementation problems not present in the design and implementation of conventional terrestrial cellular systems. For example, as the airplane circles in its flight pattern, communications beams radiated from the airplane antenna move relative to the ground, thereby causing the system to perform call handoffs as beams rotate into and out of predetermined system areas of coverage. In addition, cellular systems adjacent to the airborne system present potential beam interference issues. Large call loads in certain areas and small call loads in other areas also tend to require an airborne system to provide more power, and consume more radio spectrum, than would be necessary if the call loads in each area were balanced. In addition, multipath Doppler and delay spread within an airborne system depends on the underlying terrain characteristics and the speed of the aircraft and are more pronounced than in a conventional terrestrial cellular system, which may reduce the performance of existing user handsets. Also, variations in airplane pitch, roll and yaw can move communications beams off-target and result in interference with other cellular systems and therefore in system non-compliance with FCC regulations. Further, nonuniform subscriber density results in less efficient use of spectrum because the spectral capacity of each beam must be sized for the maximum density region. Clearly a need exists for solution to the foregoing problems.

BRIEF DESCRIPTION OF THE DRAWINGS

Advantages of the present invention will be readily apparent from the following detailed description of preferred embodiments thereof when taken together with the accompanying drawings in which.

DETAILED DESCRIPTION OF THE PREFERRED EMBODIMENTS

Figure 1:
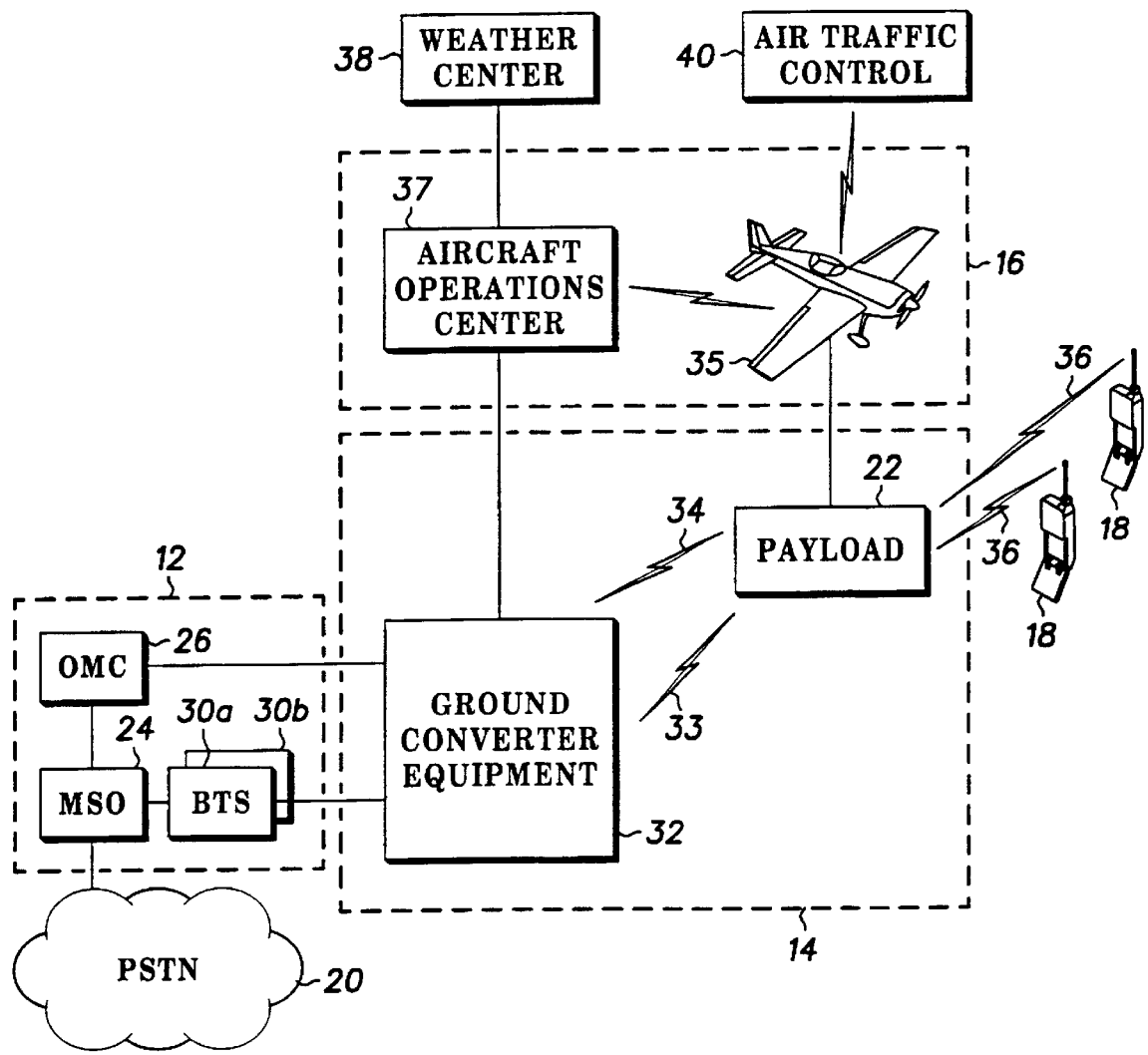
FIG. 1 is a system diagram of an airborne cellular communications system of the type in which beam shape and direction are controlled according to the present invention.

Referring now to the drawings in which like numerals reference like parts, FIG. 1 shows an airborne cellular communications system 10. The system 10 generally includes three primary segments: a cellular infrastructure segment 12, a radio infrastructure segment 14, and an airplane segment 16. These three segments in combination are capable of providing cellular communications coverage to a large geographical area by enabling system users, represented generally by handsets 18, to link to a public switched telephone network (PSTN) 20 via an airplane payload 22 including a repeater. The structure and function of each of these three system segments will be discussed in detail.

The cellular infrastructure segment 12 includes a mobile switching office (MSO) 24 that includes equipment, such as a telephony switch, voicemail and message service centers, and other conventional components necessary for cellular service. The MSO 24 connects to the PSTN 20 to send and receive telephone calls in a manner well known in the art. In addition, the MSO 24 is connected to an operations and maintenance center (OMC) 26 from which a cellular system operator manages the cellular infrastructure segment 12. The MSO 24 is also connected to one or more base transceiver stations (BTSs) such as the BTSs shown at 30a, 30b. The BTSs 30a, 30b transmit and receive RF signals from the system users 18 through the radio infrastructure segment 14.

More specifically, the BTSs 30a, 30b transmits and receives RF signals through ground converter equipment 32. The ground converter equipment 32 converts terrestrial cellular format signals to C-band format signals and communicates with the airborne payload 22 through a feeder link 33 and a telemetry link 34, each of which will be discussed later in detail. The payload 22 establishes a radio link 36 for connecting calls over a wide geographic area of coverage, or footprint, that is capable of exceeding 350 km when the airplane maintains a flight pattern at or around 30,000 feet above the ground.

In addition to the airplane 35, the airplane segment 16 also includes an airplane operations center 37 that controls mission logistics based at least in part on information from sources such as a weather center 38, and manages all system airplanes, as the system preferably includes three airplanes to ensure continuous coverage. The airplane also receives additional routine instructions from sources such as an air traffic control center 40.

Figure 2:
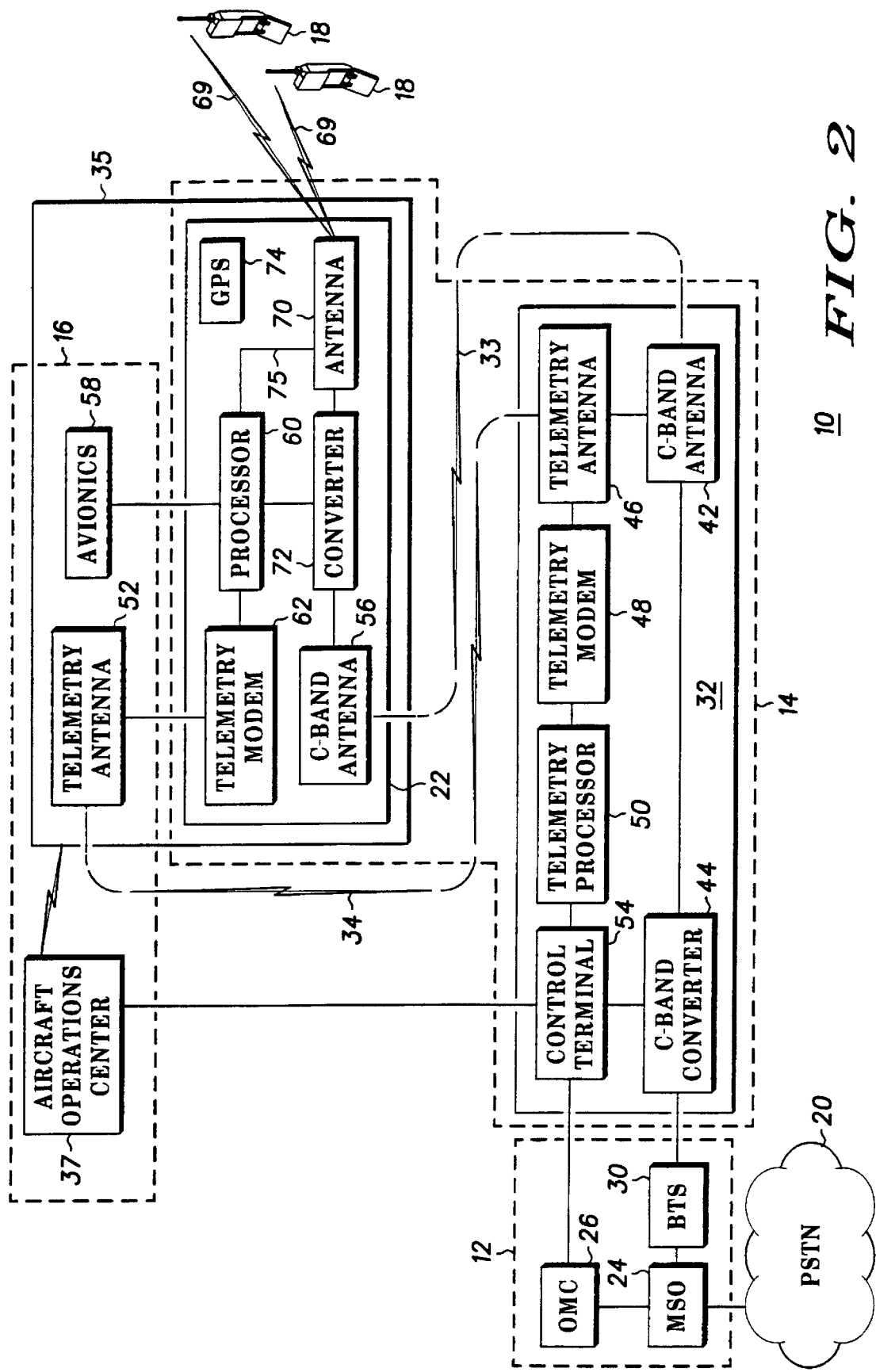
FIG. 2 is a block diagram illustrating the components of the airborne cellular communications system shown in FIG. 1 in more detail.

FIG. 2 shows certain components of the system 10 in more detail. Specifically, the ground converter equipment 32 includes two C-band antennas 42 for receiving/transmitting signals from/to the payload 22, and a C-band converter 44 for appropriately converting the signals received from or to be transmitted to the payload 22. According to a preferred embodiment, the C-band antennas 42 and the converter 44 enable 800 MHz airborne cellular smart antennas 70 to communicate with the BTSs 30a, 30b via an established downlink, or feeder link, 33, and the converter 44 upconverts nominal signals from the BTSs 30a, 30b to C-band signals before the signals are transmitted to the airplane 35. Also, each BTS 30a, 30b is assigned a different slot in the C-band spectrum so that signals from the different BTSs 30a, 30b can be separated and routed to the correct beam at the payload 22. In addition, the ground control equipment 32 includes telemetry components such as a telemetry antenna 46, a telemetry modem 48 and a telemetry processor 50 to receive and process airplane data transmitted from an airplane telemetry antenna 52, while a control terminal 54 controls transmission of the processed telemetry data to the OMC 26 and the airplane operations center 37.

In the airplane segment 16, the airplane telemetry antenna 52 mentioned above transmits airplane avionics data generated by airplane avionics equipment, represented generally at 58, including airplane location, direction and flight pattern data as well as other data such as airplane pitch, roll and yaw data. The data from the airplane avionics equipment 58 is input into and processed by a payload processor 60 before being output to the telemetry antenna 52 through a telemetry modem 62. The payload processor 60 is also responsible for processing signals transmitted to and received from the ground converter equipment 32 through the feeder link 33 established between the C-band antennas 42, 56 and for processing signals transmitted to and received from the system users 18 through a downlink, or user link, 69 established between the users 18 and a payload downlink antenna such as an 800 MHz smart antenna 70, with the signals received by and transmitted from the payload being appropriately upconverted or downconverted by an 800 MHz converter 72 before being input into a beamformer 73. In accordance with a preferred embodiment of the present invention and as will be discussed below in more detail, the beamformer 73 controls the gain, direction, and associated footprint of each communications beam transmitted by the smart antenna 70 to cause the transmitted beams to appear stationary to the respective geographic areas covered by the beams, thereby minimizing call hand-offs within the cells and optimizing the call capacity of each cell. The payload 22, in addition to including the above-mentioned equipment, also includes GPS equipment 74 that can also be input into the processor 60 and transmitted to the ground converter equipment 32 or to the airplane operations center 37 for flight control purposes. The components shown in the airplane and in the payload together form the airplane repeater that enables cellular coverage to be provided to a large geographic area that may otherwise not support terrestrial cellular coverage due to an insufficient number of cell stations or the like.

As should be appreciated from the system configuration shown in FIGS. 1 and 2, both the airborne cellular system 10 and conventional terrestrial cellular systems appear identical to the PSTN 20 and the system users 18. In other words, there are no discernable service-related differences between calls linked to the PSTN 20 through the cellular infrastructure, radio infrastructure and airplane segments 12–16 and calls handled through a conventional terrestrial system infrastructure, in part due to the fact that the cellular infrastructure segment 12 includes a standard telephony switch in the MSO 24 and BTSs 30a, 30b that are identical to those included in a conventional terrestrial system infrastructure.

Still referring to FIGS. 1 and 2, operation of the components of the airborne cellular system 10 during completion of a call made by one of the system users 18 will now be described. The airplane 35, when on-station preferably flies in a circular or near circular flight pattern (although the flight pattern may vary according to specific weather and coverage conditions) to provide coverage to a predetermined geographic area during a mission that typically lasts about 6 hours. While it is on-station, the airplane maintains contact with the ground converter equipment 32 to provide both the feeder link 33 and the user link 69 for the cellular infrastructure segment 12 through the radio infrastructure equipment segment 14. The airplane 35 also transmits a predetermined number of communications beams, such as, for example, 13 beams, over the coverage area, with each beam being assigned to a sector of one of the BTSs 30a, 30b and having its own set of control and traffic channels to carry signaling and voice data between the system users 18 and the cellular infrastructure segment 12. As the airplane 35 moves in its flight pattern, the beams radiated from the airplane rotate. Therefore, the system users 18 will "see" a different beam every 45 seconds or so and the cellular infrastructure segment 12 performs a sector to sector handoff of the call to keep the call from being dropped.

When initiating a call, a system user, such as one of the users 18, utilizes the control channels in the beam to signal the MSO 24 to request a call setup. The request is sent from a handset of the user 18 to the airplane payload 22, and then is relayed to the ground converter equipment 32. The ground converter equipment 32 relays the request to the corresponding BTS, such as the BTS 30a. The BTS 30a then transmits the request to the MSO 24, which sets up the call with the PSTN 20. The payload 22 therefore simply extends the physical layer of the BTS 30 to the users 18 to allow a much wider area of coverage than would typically be provided by a conventional terrestrial system, and with less associated infrastructure buildout cost. The airborne system 10 is also preferable for providing temporary cellular coverage for special events areas, where coverage is only needed for several days, thereby eliminating the need and cost associated with erecting cell stations and then tearing the cell stations down after the special events end.

Once the call setup is completed, voice communication with the PSTN 20 through the traffic channels in the beam is initiated, and voice information is then relayed in the same manner as the signaling information. When the call ends, a signal is sent to the MSO 24 to tear down the call, the handset of the user 18 releases the traffic channel used for voice communications, and the channel is returned to an idle state.

Figure 3:
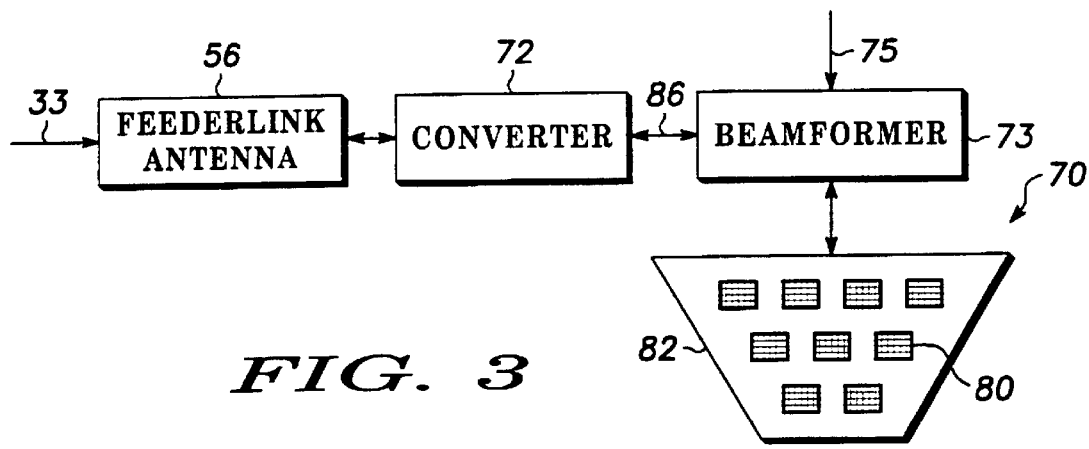
FIG. 3 is a side elevation view of a phased array antenna of the type in accordance with a preferred embodiment of the present invention, as well as of communications beams radiated from the antenna.

FIG. 3 is a simplified signal flow diagram that shows the smart antenna 70 in more detail and in accordance with a preferred embodiment of the present invention, as well as other components connected to the antenna 70. The antenna 70 is a phased array antenna that may include several patch antenna elements, such as those shown generally at 80, that are mounted within a radome structure 82 that may be, for example, flat, cylindrical or spherical. It is contemplated that more than one phased array antenna will likely be used in the payload 22. For example, in accordance with one embodiment of the present invention, three phased array antennas may be mounted to form a pyramid-shaped antenna array, with the a beamformer feeding each one of the antenna elements in the array.

Figure 6:
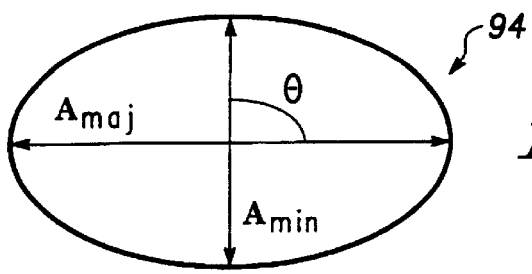
FIG. 6 is a diagram showing the major and minor axes of an exemplary beam footprint shaped according to complex antenna gain coefficients.

Signal flow to the antenna in the system forward link will now be discussed, it with it being understood that signal flow is identical, albeit opposite in direction, in the system reverse link. The C-band feeder link antenna 56 receives signals by link 33 from the ground converter antenna 42 (FIG. 2) and passes the signals to the converter 72. The converter downconverts the signals from C-band signals to UHF signals having a frequency of around 800 MHz before passing the signals to the beamformer 73 over path 86. The beamformer 73 adjusts the amplitude and phase of the signals, under control of input 75, for each of the antenna patch elements 80 in the antenna 70 (or array of antennas) based on antenna gain coefficients generated in a manner as will be described below in more detail. The antenna 70 receives the signals from the beamformer 73 and radiates the signals to the ground below in the form of antenna beams, such as the beam 94 (FIG. 6). Each antenna beam subsequently forms a footprint on the ground below that defines a communications cell to link calls within the cell to the PSTN 20.

Figure 4:
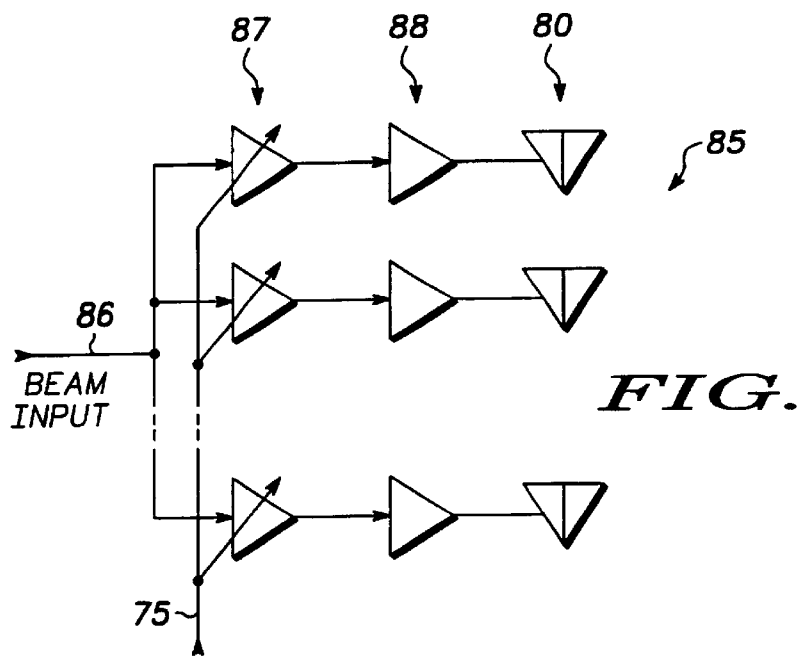
FIG. 4 is a schematic diagram of an exemplary beamformer.

As noted below processor 60 utilizes airplane information such as position, pitch, roll, yaw, etc. from avionics 58 and various load or load distribution, terrain conditions, and the like supplied from the MSO 24 or OMC 26 to generate the antenna element gain coefficients at input 75. The information from the MSO 24, etc. is provided over the telemetry link 34 from antenna 46, modem 48, processor 50, and control terminal 54. Referring to FIG. 4, an exemplary beamformer is shown at 85. The beamformer 85 is for forming beams for only one of the beams transmitted by the antenna 70; however, a beamformer of identical structure and function would be implemented for each beam to be transmitted by the antenna 70. The beamformer receives beam signals to be transmitted through a signal input 86, note this is an input for one of a plurality of beamformers. A signal phase shifter and attenuator 87 then subsequently and accordingly phase shifts and attenuates the signals according to antenna gain coefficients at input 75 generated by a processor, such as the processor 60 in the payload 22. The phase shifters and attenuators at 87 may be implemented either in analog form via an RF phase shifter and variable attenuator under digital control, or digitally by an A/D, a complex multiplier, and a D/A. Element amplifiers at 88 then amplify beam signals so that the radiated power level is sufficient for the user links before the signals are passed to and transmitted from certain of the patch antenna elements 80 that are selected based on the antenna gain coefficients.

Figure 5:
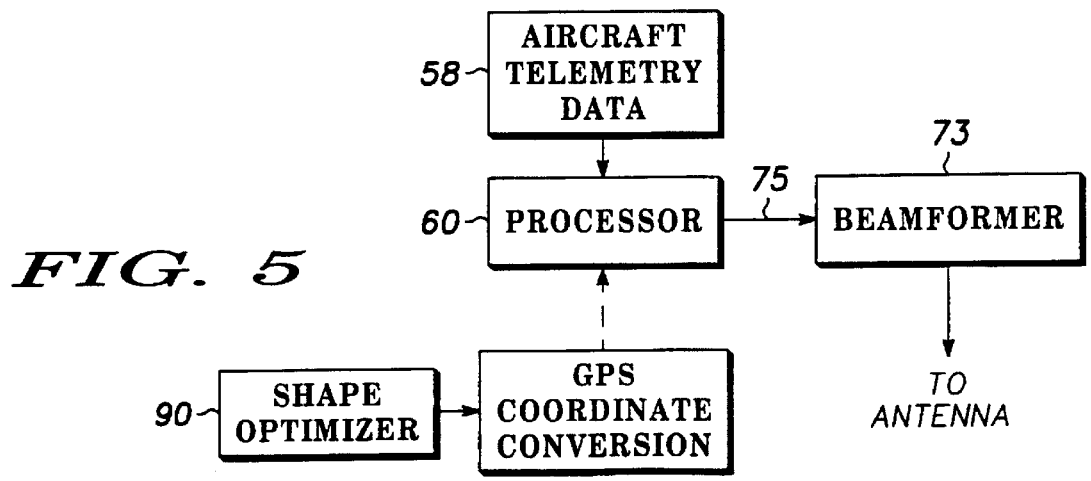
FIG. 5 is a block diagram showing the components used to generate the complex antenna gain coefficients used to shape beams output from the smart antenna according to the present invention.

FIG. 5 shows the processor 60 in the payload 22 used to generate the antenna gain coefficients, as well as its relationship to the antenna system 70 and the beamformer 73 in more detail. The processor 60 generates the antenna gain coefficients based on data input from several sources. A shape optimizer 90 in the ground converter equipment 32, or alternatively in the OMC 26, receives cell footprint data relating to, for example, call loading and potentially interfering adjacent cellular systems, and that is stored in a fixed database maintained at the OMC 26 or the MSO 24. The shape optimizer 90 uses the above data to compute the cell shape and location data. Specifically, as shown in FIG. 6, the shape optimizer 90 computes the direction of the major axis $A_{maj}$ of each cell oval, such as the oval shown at 94, as well as the ratio of the oval major axis $A_{maj}$ to its minor axis $A_{min}$, otherwise known as the oval eccentricity, in polar coordinates. The computed beam shape and location data is then converted to GPS-based coordinates before being transmitted to the processor 60 via the telemetry link 34.

In addition to receiving the cell GPS-based beam shape data, the processor 60 also receives aircraft telemetry data, including aircraft pitch, roll and yaw data, as well as airplane flight pattern location data, directly from the aircraft avionics equipment 58 of the airplane 35. The processor 60 then calculates the antenna gain coefficients on-the-fly for the antenna elements 80 based on the data received from both the ground and the airplane, and outputs the coefficients to the beamformer 73 to control the gain, direction, and shape, of each of the beams radiated from the antenna 70.

Consequently, it is possible to maintain the antenna beams in a fixed position relative to the ground by dynamically changing the beam steering angles and incorporating fast switching of traffic between beams transparent to the subscriber and cellular infrastructure equipment. The system handoff rate can therefore be maintained at a level similar to that of a conventional cellular system, thereby reducing overall system cost.

While the antenna gain coefficients are described above as being calculated by the processor 60, the coefficients can also be calculated by a terrestrial-based processor, such as the processor 50 in the ground converter equipment 32, and transmitted to the beamformer 73 via the telemetry link 34.

It should be noted at this point that cell shape and location attributes can be based on (1) the desired link margin, with smaller high gain beams being generated to cover urban areas requiring high link margin for building penetration, and with larger low gain beams being generated to cover rural areas requiring less link margin; (2) terrain characteristics, with smaller beams being generated to cover areas where terrain could create large delay and Doppler spread, and with broader beams being generated to cover areas where terrain could create smaller delay and Doppler characteristics, thereby reducing the performance impact of high delay/Doppler spread environments; (3) the distribution of cellular traffic load, with small beams being generated to cover high load density areas and with larger beams being generated to cover low density areas, thereby improving the spectral efficiency, or amount of load carried per unit bandwidth, of the system, and (4) the location of other adjacent cellular systems with beam directions, size, and sidelobe structure generated to reduce interference with other cellular systems. As will now be described, the present invention is capable of shaping communications beams based on required link margin, terrain characteristics, interference characteristics, and call traffic load.

Figure 7:
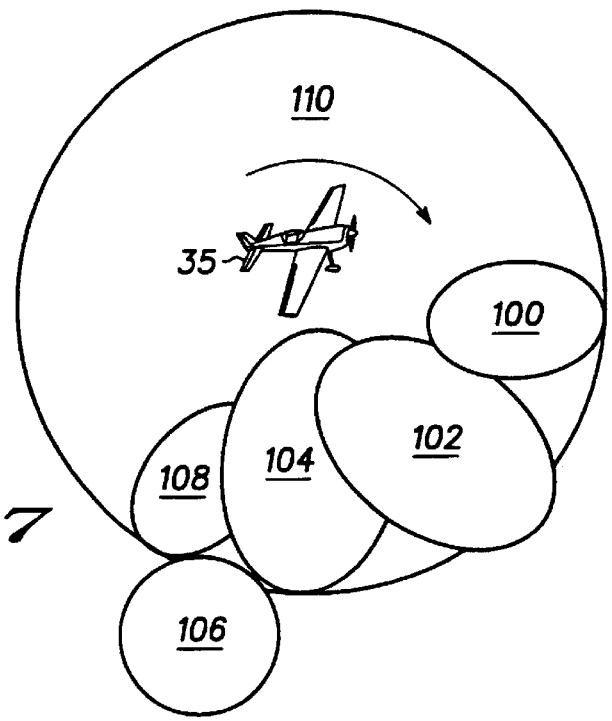
FIG. 7 is a plan view of a plane in a first flight pattern position including a repeater payload that radiates beams that provide cellular coverage to a geographic area below and that are shaped by the antenna of FIG. 3.
Figure 8:
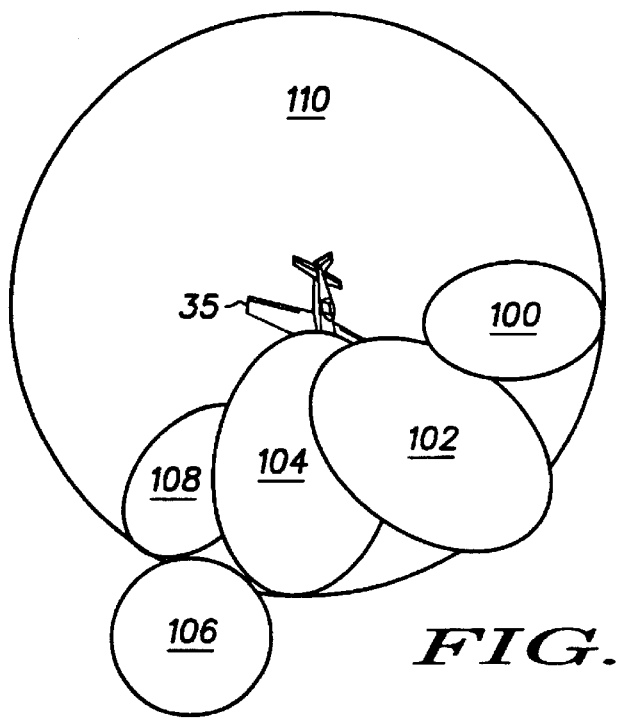
FIG. 8 is a plan view of the plane in FIG. 7 showing that beams radiated from the airplane antenna remain stationary with respect to the geographic area below, even as the airplane executes its flight pattern.

In view of the above and with reference to FIGS. 7 and 8, the airplane 35 is shown at a first flight pattern position in FIG. 7 at time t1. Beams radiated from the plane's smart antenna form beam pattern cells, or footprints, such as the exemplary footprints 100, 102, 104, 108, within a predetermined geographic area of coverage 110 (in actual operation the airplane antenna would radiate, for example, 13 beams to cover the entire geographic area 110). When the airplane 35 moves to a second flight pattern position at time t2 as shown in FIG. 8, the ground coordinates of the footprints 100, 102, 104, 108, within the predetermined geographic area of coverage 110 do not change. As a result, the system 10 is not required to hand off calls within the area of coverage 110 due to movement of the airplane 35.

Beam shape and sidelobe characteristics may be varied through the smart antenna in accordance with the present invention as a function of call traffic load and distribution. For example, as shown in FIG. 7, at time t1 the beamformer 73 shapes beams covering a high delay spread geographical region having associated footprints such as that shown at 100 so that the beam footprints are relatively small in size and high in gain, or link margin, within the smaller footprint area. The beamformer also shapes beams covering a low call demand geographical region to have associated footprints such as that shown at 102 that are relatively large in size and low in gain, as the lower amount of call traffic within the footprint does not require a large amount of system power for linking purposes.

The communications beams may also be shaped and sized based on adjacent beam footprints from other cellular systems. For example, a beam covering a low urban density geographical region has an associated footprint such as that shown at 104 that is relatively large in size and low in gain due to the low number of system users in the area. The beamformer 73 shapes and sizes the beam footprint 104 and adjusts its link margin based on the input beam coefficients to minimize interference with adjacent beam footprints, such as the footprint 106, of other cellular systems. Likewise, the beamformer 73 can adjust the sizes and shapes of beams covering high urban density geographical regions based on the input beam coefficients so that the resulting beams have associated footprints such as that shown at 108 that are relatively small in size and high in gain to support the high number of system users within the region and to minimize interference with the adjacent beam footprint 106.

The above-described embodiment was directed to a single antenna array such as the antenna 70 and a beamformer that controlled the gain and associated footprint of each communications beam transmitted from the antenna 70. However, it should be appreciated that, in an alternate embodiment, the antenna could be formed from multiple planar antennas so that fixed beam coverage on the ground could be maintained while at the same time maintaining reasonable scan angles for each of the antennas. Such multiple antenna fixed beam coverage could be realized through rapid switching of call load between beams in conjunction with changes in beam direction.

For example, the antenna 70 may be formed from three planar antennas each having a 120 azimuthal field of view (with a +/−60 azimuthal scan angle) and each providing four communications beams to therefore enable the system 10 to provide complete coverage over a 360 azimuthal field of view. For example, each antenna may have associated beam pointing directions relative to antenna boresight of −45, −15, 15 and 45 at a particular point in the flight pattern of the airplane 35, with each beam having a width of 30. As the airplane continues to execute its circular flight pattern, the four beams generated by each of the planar antennas are scanned to maintain a fixed beam position on the ground. For example, the airplane rotates within its flight pattern to a point where the above beam pointing directions change to −30, 0, 30 and 60, respectively. If the beam pointing angles were shifted further from such beam pointing directions, large scan angles and poor antenna efficiency would result.

Therefore, according with the presently-discussed alternative embodiment, large scan angles can be avoided by switching traffic between beams via, for example, a switch in the converter 72 or in a ground-based converter such as the converter 44 and resetting the beam scan angles via the beamformer processor 60. Consequently, for example, the load from a fourth beam from a first planar antenna would be switched to a fourth beam of a second planar antenna, the load on the fourth beam of the second planar antenna would be switched to the fourth beam of a third planar antenna, and the load on the fourth beam of the third antenna would be switched to the fourth beam of the first antenna. Simultaneously, the steering direction of the fourth beams from all three antennas would be switched from 60 to −60. As a result, the scan angles of all three antennas are maintained within a reasonable range, while fixed beam coverage is maintained on the ground.

In view of the foregoing discussion, it should now be appreciated that, by enabling the beam steering angles and beam shapes to be controlled, the smart antenna in accordance with the present invention enables cell boundaries and/or sizes to be varied as a function of cell load, thereby improving system performance and spectral capacity, reducing system cost by enabling smaller power amplifiers to be used in the beamformer, and reducing payload power consumption. By enabling the beam steering angles and beam shapes to be controlled, the smart antenna in accordance with the present invention also is capable of reducing multipath Doppler spread within a cell without having to replace or reconfigure payload hardware, thereby making the overall system more robust, flexible and cost effective. Further, by maintaining beam pointing even in the presence of airplane pitch, roll and yaw, the smart antenna in accordance with the present invention is able to maintain compliance with FCC regulations regarding tall-tower radiation to the horizon and interference with other cellular systems. In addition, a smart antenna in accordance with the present invention can also shape communications beams output therefrom to facilitate frequency coordination between multiple airborne cellular systems, and/or between airborne and terrestrial cellular systems.

While the above description is of the preferred embodiment of the present invention, it should be appreciated that the invention may be modified, altered, or varied without deviating from the scope and fair meaning of the following claims.

What is claimed is:

1. An aircraft-based cellular communications system, comprising:

a base transceiving station for switching calls to call destinations;

an aircraft including a beamformer for generating communications beams, an antenna having a plurality of antenna elements and corresponding amplifiers for transmitting the beams to form terrestrial communications cells that create a link between wireless communications devices within the terrestrial cells and the base transceiving station, and a telemetry link between the base transceiving station and the beamformer;

the base transceiving station including a beam shape optimizer for computing a complex gain of the antenna amplifiers based on mapping of the aircraft flight and location data to stored communications coverage cell coefficient data and for transmitting the complex gain to the antenna amplifiers of the beamformer via the telemetry link to control shapes of each of the communications coverage cells.

2. The aircraft-based cellular communications system of claim 1, wherein the beam shape optimizer dynamically computes the complex gain of the antenna amplifiers to compensate for beam pattern movement caused by movement of the aircraft.

3. The aircraft-based cellular communications system of claim 2, wherein the movement of the aircraft comprises airplane pitch, roll and yaw.

4. The aircraft-based cellular communications system of claim 1, wherein the beam shape optimizer dynamically computes the complex gain of the antenna amplifiers to adjust each of the geographic communications coverage cells based on population within the cell.

5. The aircraft-based cellular communications system of claim 1, wherein the beam shape optimizer dynamically computes the complex gain of the antenna amplifiers to minimize interference with geographic communications coverage cells of other systems.

6. The aircraft-based cellular communications system of claim 1, wherein the beam shape optimizer dynamically computes the complex gain of the antenna elements to minimize beam interference and thereby reduce overall system loading.

7. The aircraft-based cellular communications system of claim 1, wherein the beam shape optimizer dynamically computes the complex gain of the antenna elements to reduce angular spread on transmit and receive paths of antenna element beams to thereby reduce multipath Doppler spread within each geographic communications coverage cell of each of the multiple antenna elements.

8. The aircraft-based cellular communications system of claim 1, wherein the beam shape optimizer dynamically computes the complex gain of the antenna elements to re-allocate call traffic within the geographic communications coverage cell of each of them multiple antenna elements to provide for more even system call distribution.

9. An optimizer for shaping communications beams transmitted from an airborne wireless communications system repeater antenna array, comprising a processor for computing a complex gain associated with the antenna array based on mapping of repeater location data to stored communications coverage cell coefficient data, and for transmitting the complex gain to the antenna array to optimize shapes of each of the communications coverage cells.

10. The optimizer of claim 9, wherein the processor is implemented with the airborne repeater.

11. The optimizer of claim 9, wherein the processor is implemented in a terrestrial base transceiving station and communicates with the antenna array via a telemetry link.

12. A method of managing operation of an airborne repeater antenna array comprising:

receiving at least one of airplane telemetry data indicating an airplane flight pattern location, adjacent cellular system beam footprint data, and call distribution load within an airplane beam footprint;

computing desired beam direction and shape parameters based on the at least one of airplane telemetry data indicating an airplane flight pattern location, adjacent cellular system beam footprint data, and call distribution load within an airplane beam footprint; and calculating complex gains for each of multiple antenna elements to form a set of communications beams each having a desired direction and shape to thereby form terrestrial cells with corresponding locations and shapes.

13. The method of claim 12, wherein the computing of desired beam direction and shape parameters and the calculating of a complex gain for each of multiple antenna elements compensates for beam pattern movement caused by airplane movement.

14. The method of claim 13, wherein the airplane movement comprises airplane pitch, roll and yaw.

15. The method of claim 12, wherein the computing of desired beam direction and shape parameters and the calculating of a complex gain for each of multiple antenna elements comprise adjusting the communications beams to adjust the terrestrial cells based on population within each of the terrestrial cells.

16. The method of claim 12, wherein the computing of desired beam direction and shape parameters and the calculating of a complex gain for each of multiple antenna elements are performed to minimize interference with geographic communications coverage cells of other systems.

17. The method of claim 12, wherein the computing of desired beam direction and shape parameters and the calculating of a complex gain for each of multiple antenna elements comprise dynamically computing beam patterns of the communications beams to minimize inter-beam interference and thereby reduce overall system loading.

18. The method of claim 12, wherein the computing of desired beam direction and shape parameters and the calculating of a complex gain for each of multiple antenna elements accounts for angular spread of incident energy to reduce Doppler and delay spread impact.

19. The method of claim 12, wherein the computing of desired beam direction and shape parameters and the calculating of a complex gain for each of multiple antenna elements reallocates call traffic within the airplane beam footprint to balance load between the terrestrial cells.

20. A method of managing operation of an airborne repeater antenna including multiple planar antennas comprising:

receiving at least one of airplane telemetry data indicating an airplane flight pattern location, adjacent cellular system beam footprint data, and call distribution load within an airplane beam footprint;

computing desired beam direction and shape parameters based on the at least one of airplane telemetry data indicating an airplane flight pattern location, adjacent cellular system beam footprint data, and call distribution load within an airplane beam footprint; and calculating a complex gain for multiple antenna elements for each of multiple planar antennas to form a set of communications beams each having a desired direction and shape to thereby form terrestrial cells with corresponding locations and shapes; and switching beam traffic among the multiple antennas to maintain antenna scan angles within a predetermined range.

21. The method of claim 20, further comprising switching steering directions of each of the multiple planar antennas simultaneously with the switching of beam traffic among the multiple antennas to maintain antenna scan angles within a predetermined range.

* * * * *